(12) United States Patent
Takayama

(10) Patent No.: US 6,317,157 B1
(45) Date of Patent: Nov. 13, 2001

(54) IMAGE CONVERSION APPARATUS AND IMAGE CONVERSION METHOD

(75) Inventor: Akinoli Takayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/066,786

(22) Filed: Apr. 28, 1998

(30) Foreign Application Priority Data

Nov. 11, 1997 (JP) .................................................... 9-308972

(51) Int. Cl.$^7$ .............................. H04N 5/20; H04N 5/202; H04N 9/64
(52) U.S. Cl. .............................. 348/441; 348/254; 348/674
(58) Field of Search .................................... 348/254, 255, 348/256, 674, 675, 676, 677, 441; 358/519; H04N 5/202, 5/20, 9/64

(56) References Cited

U.S. PATENT DOCUMENTS

| | | | | |
|---|---|---|---|---|
| 5,479,204 | * | 12/1995 | Iwamatsu | 348/255 |
| 5,541,742 | * | 7/1996 | Imao et al. | 358/519 |
| 5,543,820 | * | 8/1996 | Edgar | 348/674 |
| 5,565,931 | * | 10/1996 | Girod | 348/675 |
| 5,589,889 | * | 12/1996 | Kawaoka | 348/674 |
| 5,685,533 | * | 11/1997 | Ishii | 348/674 |
| 5,818,521 | * | 10/1998 | Hieda | 348/254 |

FOREIGN PATENT DOCUMENTS

| | | |
|---|---|---|
| 2 305 570 | 4/1997 | (GB) . |
| 2 305 571 | 4/1997 | (GB) . |
| 4-17486 | 1/1992 | (JP) . |
| 5-273949 | 10/1993 | (JP) . |

* cited by examiner

Primary Examiner—Reinhard J. Eisenzopf
Assistant Examiner—Brian Yenke
(74) Attorney, Agent, or Firm—Staas & Halsey LLP

(57) ABSTRACT

The present invention introduces an image conversion apparatus capable of coinciding the luminance variation ratio in the display unit of the television receiver with a variation ratio according to the linear operation though the linear operation is applied to the video signal outputted from the computer. The first $\gamma$ correction circuit receives the video signal outputted from the computer. This video signal intends to be inputted to a CRT display unit, therefore, the video signal is provided with an inverse $\gamma$ property corresponding to the luminance property of the CRT display unit. The first $\gamma$ correction circuit 100 applies the $\gamma$ correction operation to the video signal so as to remove the inverse $\gamma$ property in the video signal. The linear arithmetic circuit applies the linear operation to the output from the first $\gamma$ correction circuit. The second $\gamma$ correction circuit applies the $\gamma$ operation to the output from the linear arithmetic circuit so as to provide an inverse $\gamma$ property denying the $\gamma$ property of a cathode-ray tube of the television receiver.

12 Claims, 6 Drawing Sheets

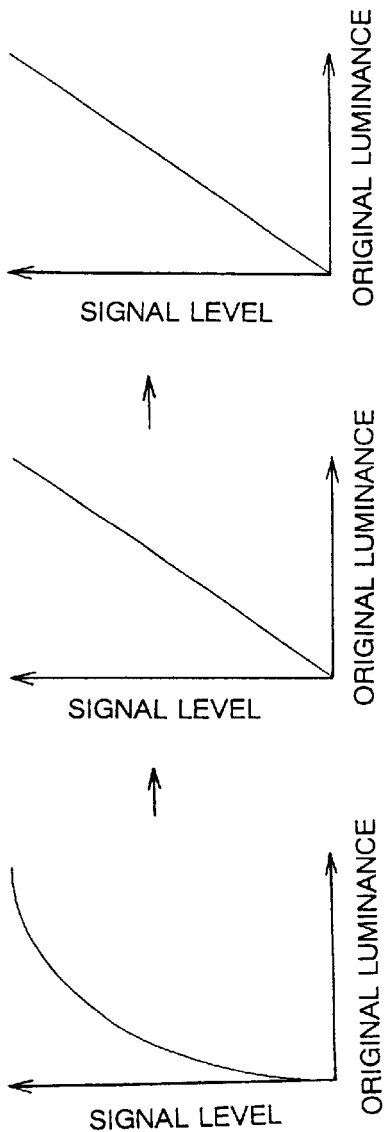
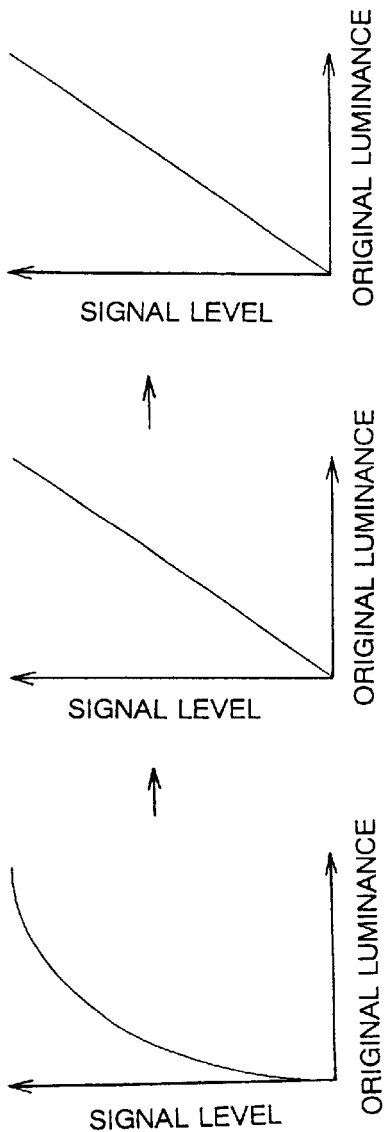
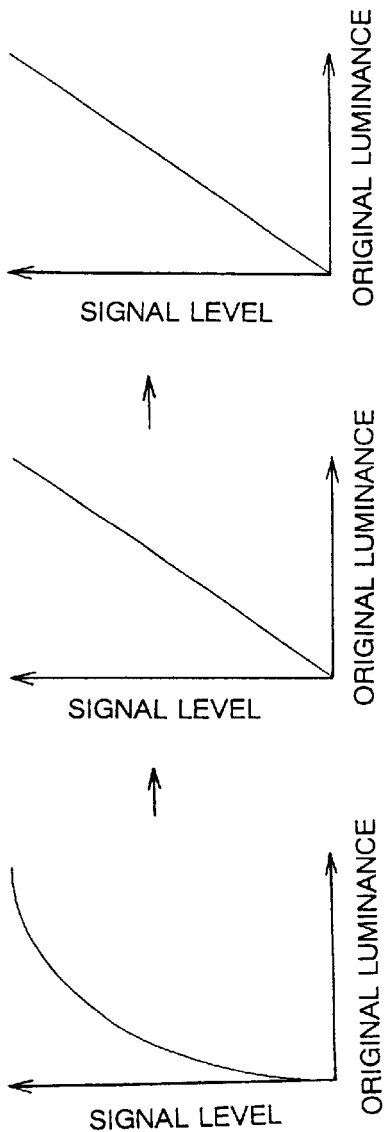
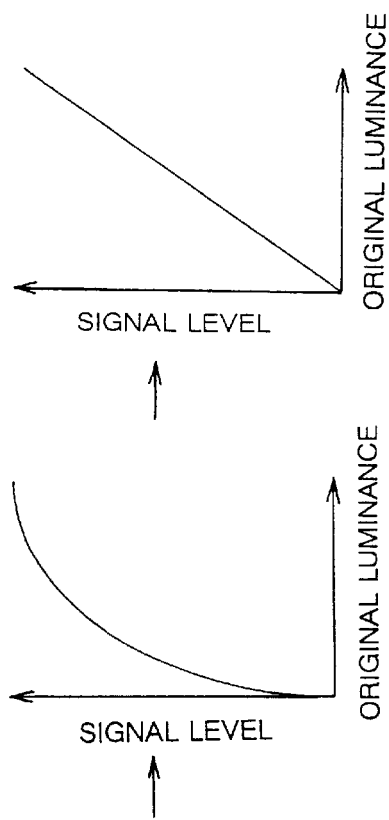
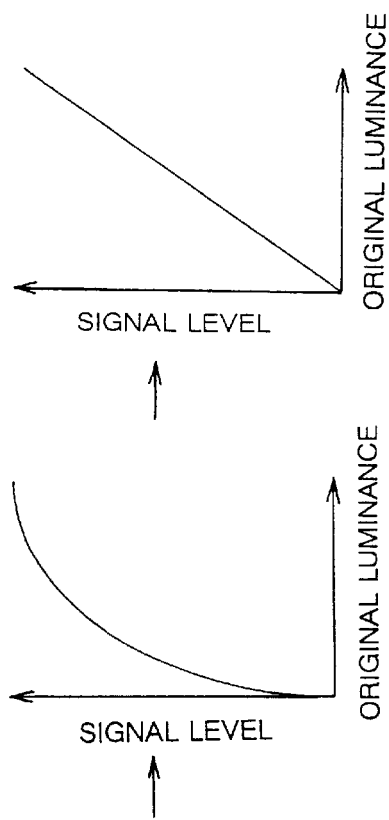

PRIOR ART
PRIOR ART
FIG. 6(a)
FIG. 6(b)
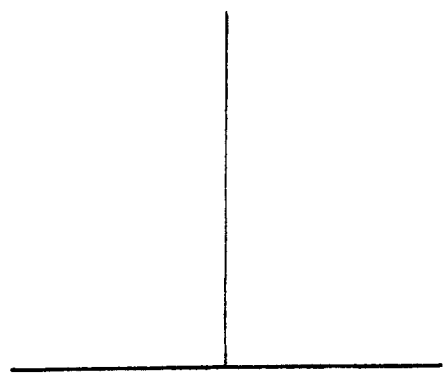
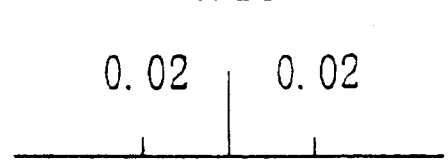

IMAGE CONVERSION APPARATUS AND IMAGE CONVERSION METHOD

BACKGROUND OF THE INVENTION

1. Field of the Invention

The present invention relates to an image conversion apparatus and an image conversion method converting a video signal outputted from computer into a television signal.

2. Description of the Related Art

Recently, in the field of computer, it is possible for a machine such as personal computer to display a game and a CG (computer graphic) using a three dimensional display without incompatibility with rapid improvement in the processing speed of processors and the performance of graphic chips. It is also considered that the infiltration of computer into a home further advances in future since a price of personal computer has lowered by the improvement of integration of an IC.

However, since a CRT display unit connected to such computer has restrictions for manufacturing, it is difficult to obtain a good progress for making the CRT display unit thinner and larger and lowering the price thereof. Therefore, conventionally, there is a case in that computer is connected to a television receiver with a big screen for home use in order to quickly display the game and the CG image using three dimensional display on the big screen. In this case, it is necessary to put an image conversion apparatus converting a video signal outputted from computer (analog RGB signal) into a television signal (composite NTSC signal, PAL signal, separate Y/C signal) between a RGB output terminal of the computer and a video input terminal of the television receiver.

The image conversion apparatus, in order to execute this signal conversion, must execute various operations in addition to that the RGB signal is converted into a YUV signal (further, a YIQ signal) and the scanning method of the video signal is converted from a non-interlace scanning into an interlace scanning.

That is the CRT display unit and the television receiver are different not only in scanning frequencies but also in scanning, namely, the CRT display unit executes under-scanning (an image is displayed in a narrower range than a screen) while the television device executes over-scanning (an image is displayed in a larger range than a screen). Accordingly, the image conversion apparatus must apply an operation converting the scanning frequency and a scaling operation reducing and magnifying an image to the video signal which is originally outputted for the CRT display unit. Further, when the scanning mode of the video signal is converted from the non-interlace scanning into the interlace scanning, components of ½ frequency components of vertical frequency produce, therefore, a flicker in which points of the high frequency appear to be blinking produces in the screen of the television receiver. Accordingly, in order to prevent an occurrence of such flicker, the image conversion apparatus must previously apply an smooth-filtering operation reducing high frequency components which will turn back to the video signal before converting the scanning mode of the video signal from the non-interlace scanning method into the interlace scanning mode.

FIG. 5 is a block diagram showing a configuration of a conventional image conversion apparatus with an arithmetic circuit executing this operation. In FIG. 5, the image conversion apparatus is provided with an A/D (analog/digital) converter 50, a RGB matrix converting circuit 51, a line memory 52, an arithmetic circuit 53, and a video encoder 54 connected sequentially from a computer side not shown (left side in FIG. 5), and a timing generation circuit 55 connected to all of them.

The A/D converter 50 is a circuit concerting each of RGB analog video signals outputted from the computer not shown into a digital signal. Incidentally, the A/D converter 50 is omitted when a digital signal is directly outputted from the computer not shown.

The RGB matrix converting circuit 51 is a circuit obtaining a YUV signal or a YIQ signal by applying, every pixel of each color digital video signal received from the A/D converter 50, a matrix operation according to a predetermined operation coefficient to each RGB luminance value in the pixel.

The line memory circuit 52 is a memory storing data (YIQ signal) of several lines (here, "1 line" indicating video signals for 1 horizontal synchronization period), and functions as a delay line.

The arithmetic circuit 53 reads data (YIQ signal) of several lines from the line memory circuit 52 at a time, and applies the scaling operation and the filtering operation stated above to the data.

The video encoder 54 converts the scanning mode into the interlace scanning for the data (YIQ signal) processed by the arithmetic circuit 53 by changing the order of each line, and converts the video signal into a television signal such as the composite NTSC signal or the PAL signal by executing a predetermined synthesis process. Then, the video encoder 54 inputs the television signal into a video input terminal of the television receiver not shown so as to display the image processed by the computer not shown on a television screen.

The timing generation circuit 55 generates predetermined timing signals for the video signal (such as a horizontal synchronous signal, a vertical synchronous signal, and a color modulation reference signal), and controls the line memory circuit 52.

However, the arithmetic circuit 53 in the conventional image conversion apparatus executes the various arithmetic processes as a simple linear operation without taking the luminous property (γ property) of the CRT into consideration. Therefore, the conventional image conversion apparatus produces the following problems latently.

In other words, the most popular CRT as a display unit of the television receiver has a nonlinear luminous property (γ property) shown in the follows expression (1), therefore, it is impossible to make the luminosity be in proportion to the level of the input signal.

$$a = Kb\gamma \tag{1}$$

where "a" is luminosity, "k" is a proportional constant which is peculiar every apparatus, and "b" is an input voltage. Therefore, the correction (γ correction) shown in the follows expression (2) is previously applied to a broadcast wave in order to keep an inverse γ property counteracting the luminous property (γ property) of the CRT.

$$c' = c^{1/\gamma} \tag{2}$$

where "c" is a voltage which is virtually in proportion to the luminance of each color R, G or B on the CRT as to the analog RGB signal outputted from the computer and is a voltage in proportion to the original luminance of the image on the CRT as to the television signal. Further, c' is a voltage of each RGB color signal actually outputted from the computer as to the analog RGB signal, and is a voltage of RGB signal before the color modulation as to the television signal. As the value of "γ", 2.2 is set as a reference value for the NTSC, and 2.8 is set as a reference value for the PAL.

The video signal which is virtually γ corrected is inputted into the arithmetic circuit 53 in the conventional image conversion apparatus. However, the arithmetic circuit 53 in the conventional image conversion apparatus applies only the linear operation to the video signal which is provided with the nonlinear property by the γ correction. Accordingly, the variation ratio of the signal is not mutually consistent with the variation ratio of the luminance in the image by the linear operation on the display unit of the television receiver.

For example, as shown FIGS. 3(a) and 3(b), it is assumed that a smooth-filtering operation of which the impulse response is (1/4, 1/2, 1/4) to the luminance signal Y in the arithmetic circuit 53. In this case, when the γ-corrected luminance signal Y is inputted into the arithmetic circuit 53 as shown in FIG. 6(a), the arithmetic circuit 53 sets a luminance value of a pixel in a line to be processed to ½·Y (=0.5) and adds ¼·Y (=0.25) to each of luminance values of pixels vertically adjacent to each other. When such the filtered luminance signal Y is inputted into the television receiver, the luminance on the display unit is shown by the above described expression (1) because of γ property of the television receiver. That is, in a case of γ=2.8 (PAL), as to the luminance signal Y, $$A=0.5^{2.8}=0.14 \text{ (where the proportional constant K=1)} \quad (3)$$

and each additional luminance to each of the vertical pixels, $$A=0.25^{2.8}=0.02 \text{ (where the proportional constant k=1)} \quad (4).$$

As above described, on the display unit of the television receiver, the luminance values of the pixels in the line to be processed and the luminance values of the pixels vertically adjacent to each other is not consistent with the ratio of (1/4, 1/2, 1/4) (refer to FIG. 6(b)), therefore, it results in that the response of the signal is distorted.

SUMMARY OF THE INVENTION

In views of such problems in the conventional image conversion apparatus, it is the object of the present invention to provide an image conversion apparatus and an image conversion method capable of making a luminance variation ratio on a display unit of a television receiver coincide with a variation ratio according to the linear operation though a linear operation is applied to an video signal outputted from computer.

The present invention introduces the following aspects in order to solve the above described problems.

That is, the first aspect of an image conversion apparatus converts an video signal outputted from computer into a television signal capable being displayed by a television receiver. The image conversion apparatus comprises a first correction circuit counteracting an inverse luminous property in the video signal outputted from the computer, a linear arithmetic circuit executing a predetermined linear operation for the video signal outputted from the first correction circuit, and a second correction circuit providing the video signal outputted from the linear arithmetic circuit with an inverse luminous property counteracting a luminous property of the television receiver.

With this configuration, the video signal outputted from the computer, based on the luminous property of the display unit expected as an output point of this video signal, is provided with a predetermined inverse luminous property counteracting this luminous property, therefore, the first correction circuit eliminates the predetermined inverse luminous property in this video signal. Accordingly, the luminous value of the video signal outputted from the first correction circuit becomes linearly proportional to the original luminous value of this video signal. The linear arithmetic circuit applies various linear arithmetic processes to the video signal outputted from the first correction circuit. At this time, the video signal to be processed is provided with a linear property, therefore, the luminance value of the video signal after the linear operation also becomes linearly proportional to the original luminous value of the image which is an origin of the video signal. The second correction circuit, based on the luminous property of the television receiver connected to the image conversion apparatus, provides the video signal outputted from the linear arithmetic circuit with a predetermined inverse luminous property counteracting this luminous property. The video signal outputted from this the second correction circuit is inputted into the television receiver. The television receiver is provided with the luminous property, therefore, when an image is displayed based on the video signal, the luminosity of the displayed image becomes linearly proportional to the original luminous value of the image which is the origin of the video signal.

The video signal outputted from computer may be an analog signal or an digital signal. Similarly, the first correction circuit, the linear arithmetic circuit and the second correction circuit may be analog circuits and digital circuits. When the video signal is an analog signal and each circuit is a digital circuit, an A/D (analog-digital) converter may be connected to a front stage of the first correction circuit. On the other hand, when the video signal is a digital signal and each circuit is an analog circuit, an D/A (analog-digital) converter may be connected to a front stage of the first correction circuit.

The video signal outputted from the computer may also be a monochromatic video signal, and may be color video signal. When the video signal is a color video signal, a first correction circuit, a linear arithmetic circuit and a second correction circuit may be prepared for each color video signal. Then, a RGB-YUV converting circuit is connected to a post stage of each the second correction circuit prepared for each color, and a television signal such as a composite NTSC signal, a PAL signal and a separate Y/C signal may be generated.

As the linear arithmetic process executed by the linear arithmetic circuit, it is desirable to execute a smooth filtering process counteracting a noise in ½ frequency components of the vertical frequency when the image conversion apparatus is provided with a scanning mode changing circuit changing the scanning mode of the video signal from the non-interlace scanning mode to the interlace scanning mode. As another example of the linear arithmetic process, there is a process magnifying and reducing an image displayed on the television receiver in the vertical direction and the horizontal direction.

The second aspect of the image conversion further comprises a scanning mode changing circuit changing a scanning mode of the video signal outputted from the second correction circuit from a non-interlace mode to a interlace mode, and is specified by that the linear arithmetic circuit applies to the video signal with a linear arithmetic process smoothing an image in a vertical direction.

The third aspect of the image conversion apparatus is specified by that the linear arithmetic circuit applies to the video signal with a linear arithmetic process for reducing and magnifying an image displayed by the television receiver in a vertical direction and in a horizontal direction.

The fourth aspect of the image conversion apparatus is specified by that the video signal outputted from the computer consists of red, green and blue video signals, the first correction circuit, the linear arithmetic circuit and the second correction circuit are provided for each of the red, green and blue video signals, and the apparatus further comprises a conversion circuit outputting a luminance signal and a color-difference signal based on each of the red, green and blue video signals outputted from the second correction circuit.

The fifth aspect of the image conversion method converts an video signal outputted from computer into a television signal capable being displayed by a television receiver. The method comprises a step of counteracting an inverse luminous property in the video signal outputted from the computer, a step of executing a predetermined linear operation for the video signal having no inverse luminous property, and a step of providing the video signal with an inverse luminous property counteracting a luminous property of the television receiver.

With this, the video signal outputted from the computer, based on the luminous property of the CRT display expected as an output point of the video signal, is equivalent to have a predetermined inverse luminous property counteracting the luminous property, therefore, the process counteracting the inverse luminous property is applied to the video signal. Accordingly, the luminous value of the video signal with no inverse luminous property becomes in linearly proportion to the original luminous value of this video signal. Then, various linear arithmetic processes are applied to the video signal of which the inverse luminous property is eliminated. At this time, the video signal to be processed has the linear property, therefore, the luminous value of the video signal after the linear arithmetic processes also becomes in linearly proportion to the original luminous value of the image which is the origin of the video signal. Then, based on the luminous property of the television receiver connected to the image conversion apparatus, the predetermined inverse luminous property counteracting the luminous property is given to the video signal after the linear arithmetic processes. The video signal to which the predetermined inverse luminous is given is inputted into the television receiver. The television receiver is provided with the luminous property, therefore, when an image is displayed based on this video, the luminosity of the displayed image becomes in linearly proportion to the original luminous value of the image which is the orig of the video signal.

BRIEF DESCRIPTION OF THE DRAWINGS

Other objects and advantages of the present invention will become apparent during the following discussion conjunction with the accompanying drawings, in which:

FIGS. 4(a) through 4(e) are explanatory views showing actions of the image conversion apparatus;

FIGS. 6(a) and 6(b) are views showing relations between an input signal and a luminosity on a display unit according to a conventional image conversion apparatus.

DETAILED DESCRIPTION OF THE PREFERRED EMBODIMENT

Hereinafter, concrete explanations will be given of an embodiment according to the present invention with reference to the drawings.

First, an explanation will be given of an outline of the present invention.

Figure 1:
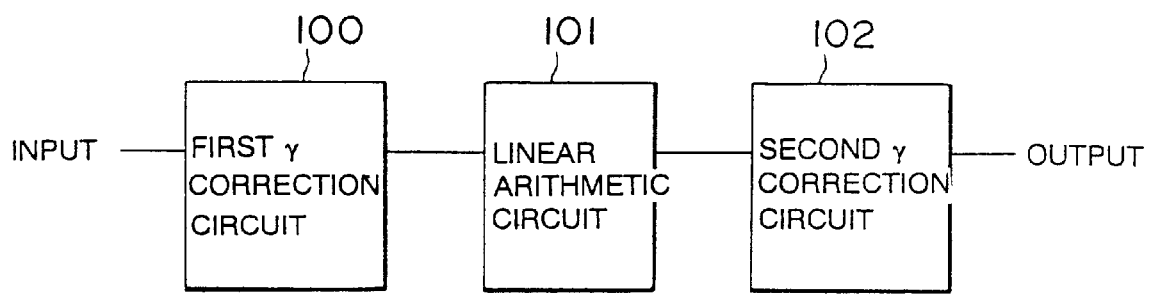
FIG. 1 is a view showing an outline of the present invention.

An image conversion apparatus of the present invention converts an video signal outputted from computer into a television signal capable being displayed by a television receiver. The image conversion apparatus, as shown in FIG. 1, is provided with a first γ correction circuit 100 applying a γ correction process to the video signal outputted from the computer so as to invert an inverse γ property in the video signal, a linear arithmetic circuit 101 applying a predetermined linear arithmetic process to the video signal outputted from the first γ correction circuit 100, and a second γ correction circuit 102 applying a γ correction process to the video signal outputted from the linear arithmetic circuit 101 in order to provide the video signal with an inverse γ property counteracting an γ property of the television receiver.

With this configuration, the video signal outputted from the computer is previously provided with a predetermined inverse γ property in accordance with a γ property of a display unit, which is originally planned as a output point of the video signal, so as to invert this γ property. The first γ correction circuit 100 applies a γ correction process counteracting this reverse γ property to this video signal. Accordingly, the luminous value of the video signal outputted from the first γ correction circuit 100 becomes linearly proportional to the original luminous value of the video signal. Then, the linear arithmetic circuit 101 applies various linear arithmetic processes to the video signal outputted from the first γ correction circuit. At this time, since the video signal to be processed has a linear property, the luminous value of the video signal after the linear arithmetic process becomes linearly proportional to an original luminous value of an image which is an origin of the video signal. The second γ correction circuit 102 applies the γ correction process to the video signal outputted from the linear arithmetic circuit in accordance with the γ property of the television receiver connected to the image conversion apparatus in order to give the predetermined inverse γ property counteracting the γ property.

The video signal outputted from this the second γ correction circuit 102 is inputted into the television receiver. The television receiver has the above-described γ property, therefore, when an image is displayed based on this video signal, the luminosity of the displayed image becomes linearly proportional to the original luminous value of the image which is the origin of the video signal.

Next, an explanation will be given of an embodiment of the present invention.

Figure 2:
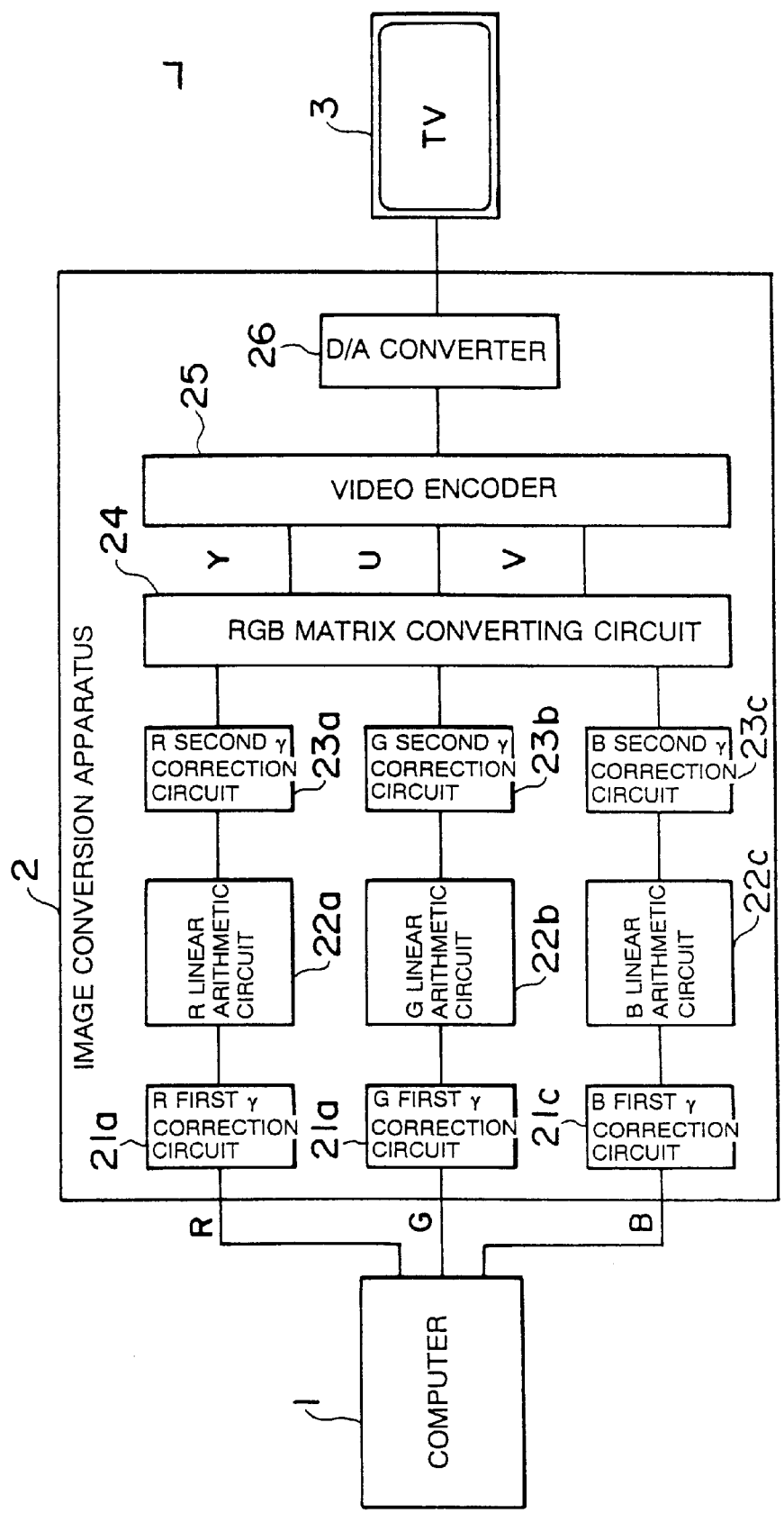
FIG. 2 is a block diagram showing a configuration of an image conversion apparatus according to an embodiment of the present invention.

FIG. 2 is a block diagram showing that an image conversion apparatus 2 of the embodiment in the present invention is connected between a digital RGB output terminal of computer 1 and a video input terminal of a television receiver 3. In this embodiment, a digital video signal of which the luminous value is represented by the 8 bit scale (0 through 255) is outputted from the digital RGB output terminal of the computer 1 every color. The digital video signal of each color is previously and virtually provided with an inverse γ property counteracting a luminous property (γ property, γ=2) of a CRT display unit not shown to be connected to the computer 1. It is assumed that the television receiver 3 conforms to the PAL system, therefore, the display unit thereof has a luminous property of γ=2.8 (γ property), and that an analog video signal (PAL signal) is inputted from the video input terminal.

The image conversion apparatus 2 of this embodiment, as shown in FIG. 2, is provided with a R first γ correction circuit 21a receiving a R signal (red video signal) outputted from the digital RGB terminal of the computer 1, a G first γ correction circuit 21b receiving a G signal (green video signal), and a B first γ correction circuit 21c receiving a B signal (blue video signal). Among these, the R first γ correction circuit 21a is connected to a R linear arithmetic circuit 22a, the G first γ correction circuit 21b is connected to a G linear arithmetic circuit 22b, and the B first γ correction circuit 21c is connected to a B linear arithmetic circuit 22c. Further, the R linear arithmetic circuit 22a is connected to a R second γ correction circuit 23a, the G linear arithmetic circuit 22b is connected to a G second γ correction circuit 23b, and the B linear arithmetic circuit 22c is connected to a B second γ correction circuit 23c. These R second γ correction circuit 23a, G second γ correction circuit 23b and B second γ correction circuit 23c are connected to a RGB matrix converting circuit 24. The RGB matrix converting circuit 24 is connected with a video encoder 25, and the video encoder 25 is connected with a D/A converter 26.

Each first γ correction circuit 21 applies a non-linear conversion (first γ correction process), which is equivalent to the luminous property (γ property) of the not-shown CRT display unit to be connected to the computer, to the inputted digital video signal of each color in order to invert the inverse γ property in the digital video signal. Concretely, each the first γ correction circuit 21 normalizes each luminous value in the inputted digital video signal (inputted data) of every color by dividing each luminous value by the maximum luminance value (255), and applies the non-linear conversion according to the expression (1) (where γ=2.0, k=1023) to the normalized value. That is, the operation according to the following expression (5) is executed for the inputted digital video signal (inputted data), whereby output data is obtained.

$$\text{Output data} = (\text{input data}/255)^{2.0} \times 1023 \qquad (5)$$

As a result of this operation, a value of the output data becomes in proportion to the luminance of an image on a CRT display unit not shown in a case of that input data is directly inputted into the CRT display unit. Further, in order to output this output data, the output terminal of each the first γ correction circuit 21 is a 10 bit parallel terminal.

Figure 3A:
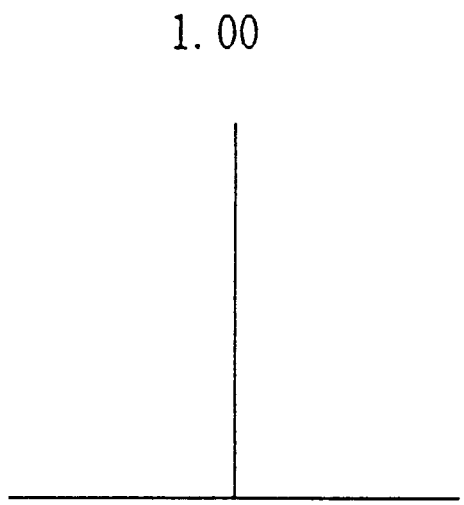
FIGS. 3(a) and 3(b) are explanatory views showing a smooth-filtering process executed by each linear arithmetic circuit.
Figure 3B:
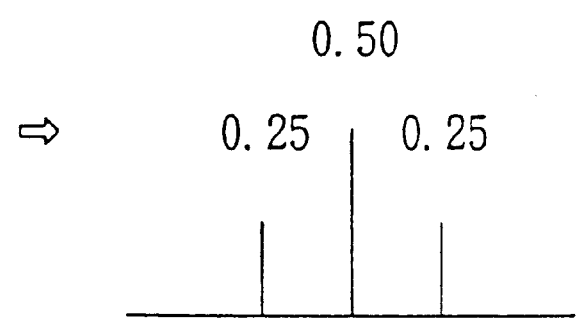
Figure 5:
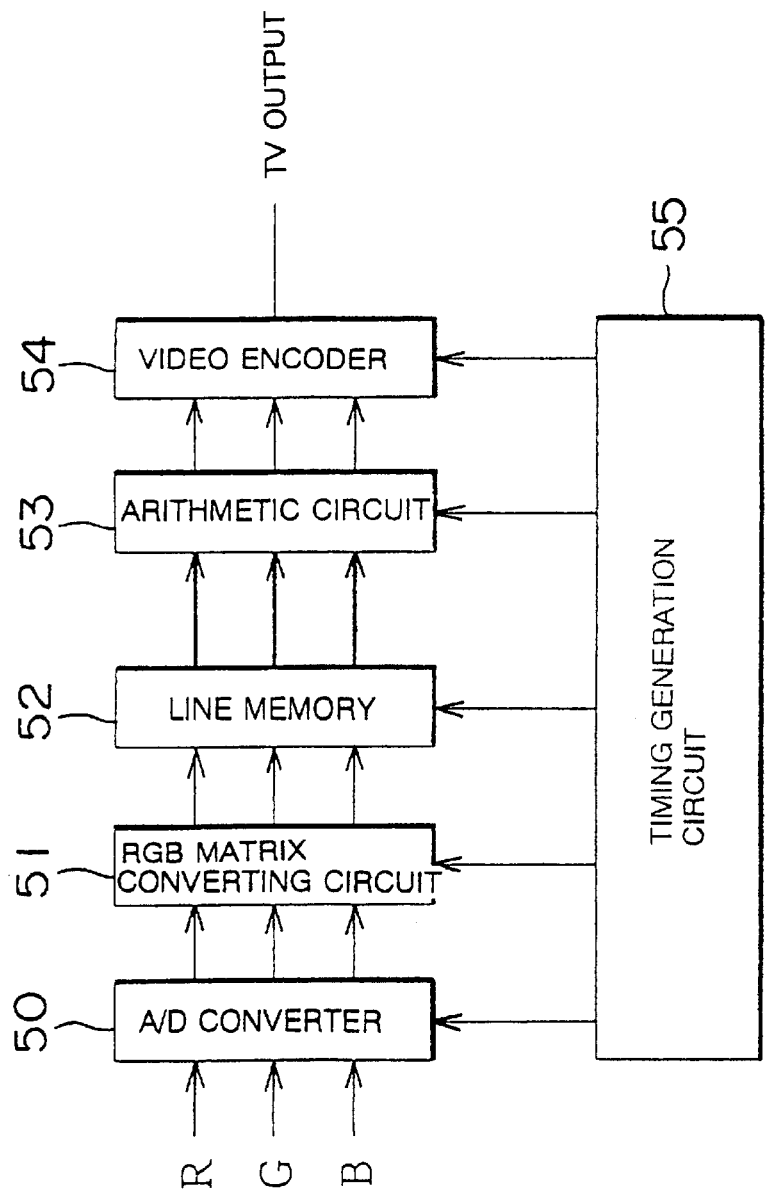
FIG. 5 is a block diagram showing a configuration of a conventional image conversion apparatus.

Each the linear arithmetic circuit 22 applies various processes displaying an image generated in the computer 1 on the display unit of the television receiver 3, for example, a compensation process such as a scaling in the horizontal and vertical directions (a process reducing and magnifying the image) and a filtering as shown in FIG. 3 (FIG. 3 show a smooth filtering in which impulse response is (¼, ½, ¼), to the output of each the first γ correction circuit 21 connected thereto. Additionally, each the linear arithmetic circuit 22 is provided with a line memory keeping video signals for several lines to be used for the process in the vertical direction.

Each the second γ correction circuit 23 applies a non-linear conversion (the second γ correction arithmetic process) to data transmitted from each the linear arithmetic circuit 22 connected thereto in order to provide the data with the an inverse γ property counteracting the luminous property (γ property) of the display unit in the television receiver 3. Concretely, each the second γ correction circuit 23 generalizes the inputted data of each color by eliminating components of the proportional constant k from the inputted data and applies the non-linear conversion (where γ=2.8) according to the above described expression (2) to the generalized data, and then converts the data into a scale value (0 through 255). That is, the operation according to the following expression (6) is executed for the inputted data, whereby output data (luminance signal of each color) is obtained.

$$\text{Output data} = (\text{input data}/1023)^{1/2.8} \times 255 \qquad (6)$$

Additionally, in order to input this input data, the input terminal of each the second γ correction circuit 23 is a 10 bit parallel terminal.

The RGB matrix converting circuit 24 applies a matrix operation according to the following expression (7) to each color luminance signal inputted from each the second γ correction circuit 23, thereby outputting a luminance signal Y, a color-difference signal U (R-Y) and a color-difference signal V (B-Y).

$$\begin{bmatrix} +0.30 & +0.59 & +0.11 \\ +0.70 & -0.59 & -0.11 \\ -0.30 & -0.59 & +0.89 \end{bmatrix} \begin{bmatrix} R \\ G \\ B \end{bmatrix} = \begin{bmatrix} Y \\ U \\ V \end{bmatrix} \qquad (7)$$

The video encoder 25 appropriately synthesizes the luminance signal Y and the color-difference signals U and V respectively outputted from the RGB matrix converting circuit 24, thereby generating a digital PAL signal.

The D/A converter 26 converts the television signal (digital PAL signal) as a digital signal line outputted from the video encoder 25 into an analog signal, and outputs the analog signal to the television receiver 3.

Next, an explanation will be given of an action of the image conversion apparatus according to this embodiment with reference to FIGS. 4(a) through 4(b). It is assumed that the computer outputs a digital video signal with a non-linear inverse γ property (1/γ, where γ=2) shown in FIG. 4(a) for the original luminance in the image generated in the computer. In this case, each the first γ correction circuit 21 applies the operation according to the above expression (5) to the digital video signal of each color. For example, when all of digital values corresponding to the luminance values of the inputted R, G, B digital video signals are 255, the calculated result of the above expression (5) is indicated by the following expression (8).

$$\text{Output data} = (255/255)^{2.0} \times 1023 = 1023 \qquad (8)$$

As a result of this operation, the output data of each the first γ correction circuit 21, as shown in FIG. 4(b), linearly corresponds to the original luminance value.

Each the linear arithmetic circuit 22 applies the smooth filtering arithmetic process to the data outputted from each the first γ correction circuit 21 so that the impulse response becomes (1/4, 1/2, 1/4). As a result, this data becomes a signal line of (256, 512, 256). The value of "512" is remained as a luminance value for the pixel on the line to be processed, and the values of "256" is distributed as luminance values for pixels on the up and down lines adjacent to the line to be processed. As a result of this smooth filtering arithmetic process (linear arithmetic process), a state is kept in that the output data of each the first γ correction circuit 21 linearly corresponds to the original luminous value as shown in FIG. 4(c).

Each the second γ correction circuit 23 applies the operation according to the above expression (6) to the data outputted from each the linear arithmetic circuit 22, namely, data with the value "512" corresponding to the luminance value of the pixel on the line to be processed and data with the value "256" corresponding to the luminance value of the pixel on the up and down lines adjacent to the line to be processed. The results of this operation are shown by the following expressions (9) and (10).

$$\text{Output data (line to be processed)} = (512/1023)^{1/2.8} \times 255 \approx 199 \quad (9)$$

$$\text{Output data (adjacent line)} = (256/1023)^{1/2.8} \times 255 \approx 155 \quad (10)$$

As a result of this operation, the output data of each the first γ correction circuit 21, as shown in FIG. 4(d), non-linearly corresponds to the original luminance value.

The RGB matrix converting circuit 24 executes the conversion according to the above expression (7). As above described, when all of the luminance values of the RGB video signals are equivalent one another, the value of the luminance signal Y after conversion becomes equivalent to the luminance value of each of the R, G, B video signals before the matrix conversion.

The signals Y, U, V outputted from the RGB matrix converting circuit 24 are combined as a digital PAL signal by the video encoder 25, and converted into an analog signal by the D/A converter 26, thereafter, inputted into the video input terminal of the television receiver 3.

The display unit of the television receiver 3 displays an image based on the inputted PAL signal. At that time, the display unit has a luminous property of γ=2.8, therefore, the display unit displays an image in a luminosity related to the above expression (1) based on the luminance signal Y of the line to be processed (=199·D, where D is a proportional constant in A/D conversion, and set as 1 here) and the luminance signal Y of the adjacent line (=155·D). In addition, it is assumed that the proportional constant k in the expression (1) is 1.

$$\text{Luminosity (line to be processed)} = k \cdot 199^{2.8} \approx 2730000 \quad (11)$$

$$\text{Luminosity (adjacent line)} = k \cdot 155^{2.8} \approx 1360000 \quad (12)$$

As a result, the luminosity of the image displayed on the display unit of the television receiver 3, as shown in FIG. 4(e), linearly corresponds to the original luminous value.

Further, as understood from the above expressions (12) and (11), concerning the image displayed on the display unit of the television receiver, the luminosity of the line to be processed (=2730000) and the luminosity of the line vertically adjacent to the line to be processed (=1360000) follow the ratio of (1/4, 1/2, 1/4) in the impulse property of the smooth filtering in each the linear arithmetic circuit 22. Accordingly, in the image conversion apparatus of this embodiment, it is possible to obtain an expected luminous property, therefore, there is no casein that a response of the signal is distorted.

As explained above, according to this embodiment, though a linear operation is applied to an video signal outputted from computer, it is possible to coincide a luminance variation ratio on the display unit of the television receiver with a variation ratio according to this linear operation.

Additionally, in this embodiment, the video signal outputted from the computer is processed in the image conversion appratus. The present invention, however, is not limited to this embodiment, a circuit fuctioning equally to the image conversion appratus may be implemented in the computer and this circuit may apply an image conversion process to a video signal in the computer.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. An image conversion apparatus converting a video signal outputted from a computer into a television signal capable of being displayed by a television receiver, comprising:

a first correction circuit counteracting an inverse luminous property in the video signal outputted from the computer;

a linear arithmetic circuit executing a predetermined linear operation for the video signal outputted from the first correction circuit;

a second correction circuit providing the video signal outputted from the linear arithmetic circuit with an inverse luminous property counteracting a luminous property of the television receiver; and a scanning mode changing circuit changing a scanning mode of the video signal outputted from the second correction circuit from a non-interlace mode to a interlace mode, wherein said linear arithmetic circuit applies to the video signal with a linear arithmetic process smoothing an image in a vertical direction.

2. An image conversion apparatus converting a video signal outputted from a computer into a television signal capable of being displayed by a television receiver, comprising:

a first correction circuit counteracting an inverse luminous property in the video signal outputted from the computer;

a linear arithmetic circuit executing a predetermined linear operation for the video signal outputted from the first correction circuit; and a second correction circuit providing the video signal outputted from the linear arithmetic circuit with an inverse luminous property counteracting a luminous property of the television receiver, wherein said linear arithmetic circuit applies to the video signal with a linear arithmetic process for reducing and magnifying an image displayed by the television receiver in a vertical direction and in a horizontal direction.

3. An image conversion apparatus converting an video signal outputted from computer into a television signal capable being displayed by a television receiver, said apparatus comprising:

a first correction circuit counteracting an inverse luminous property in the video signal outputted from the computer;

a linear arithmetic circuit executing a predetermined linear operation for the video signal outputted from the first correction circuit; and a second correction circuit providing the video signal outputted from the linear arithmetic circuit with an inverse luminous property counteracting a luminous property of the television receiver, wherein the video signal outputted from the computer consists of red, green and blue video signals, wherein said first correction circuit, said linear arithmetic circuit and said second correction circuit are provided for each of the red, green and blue video signals, and wherein said apparatus further comprises a conversion circuit outputting a luminance signal and a color-difference signal based on each of the red, green and blue video signals outputted from the second correction circuit.

4. An image conversion method converting an video signal outputted from computer into a television signal capable being displayed by a television receiver, comprising:

counteracting an inverse luminous property in the video signal outputted from the computer;

executing a predetermined linear operation for the video signal in which the inverse luminous property is counteracted;

providing the video signal for which the predetermined linear operation is executed with another inverse luminous property counteracting a luminous property of the television receiver; and changing scanning mode of the video signal with the another inverse luminous property from a non-interlace mode to a interlace mode, wherein said predetermined linear operation is a linear arithmetic process smoothing an image in a vertical direction.

5. An image conversion method converting an video signal outputted from computer into a television signal capable being displayed by a television receiver, comprising:

counteracting an inverse luminous property in the video signal outputted from the computer;

executing a predetermined linear operation for the video signal in which the inverse luminous property is counteracted; and providing the video signal for which the predetermined linear operation is executed with another inverse luminous property counteracting a luminous property of the television receiver, wherein said predetermined linear operation is a linear arithmetic process reducing and magnifying an image displayed by the television receiver in a vertical direction and in a horizontal direction.

6. An image conversion method converting an video signal outputted from computer into a television signal capable being displayed by a television receiver, said method comprising:

counteracting an inverse luminous property in the video signal outputted from the computer;

executing a predetermined linear operation for the video signal in which the inverse luminous property is counteracted; and providing the video signal for which the predetermined linear operation is executed with another inverse luminous property counteracting a luminous property of the television receiver, wherein the video signal outputted from the computer comprises red, green and blue video signals, wherein the inverse luminous property in each of the red, green and blue video signals is counteracted, the predetermined linear operation is executed for each of the red, green and blue video signals in which the inverse luminous property is counteracted, and each of the red, green and blue video signals for which the predetermined linear operation is executed is provided with another inverse luminous property counteracting a luminous property of the television property of the television receiver, and wherein said method further comprises a step of outputting a luminance signal and a color-difference signal based on each of the red, green and blue video signals with the another inverse luminous property.

7. An image conversion apparatus converting a first video signal outputted into a television signal comprising:

a first correction circuit counteracting an inverse luminous property in the first video signal;

a linear arithmetic circuit executing a predetermined linear operation for a second video signal outputted from the first correction circuit;

a second correction circuit providing a third video signal outputted from the linear arithmetic circuit with another inverse luminous property counteracting another luminous property of the television; and a scanning mode changing circuit changing a scanning mode of the third video signal outputted from the second correction circuit from a non-interlace mode to a interlace mode, wherein said linear arithmetic circuit applies to the second video signal with a linear arithmetic process smoothing an image in a vertical direction.

8. An image conversion apparatus converting a first video signal outputted into a television signal, comprising:

a first correction circuit counteracting an inverse luminous property in the first video signal;

a linear arithmetic circuit executing a predetermined linear operation for a second video signal outputted from the first correction circuit; and a second correction circuit providing a third video signal outputted from the linear arithmetic circuit with another inverse luminous property counteracting another luminous property of the television, wherein said linear arithmetic circuit applies to the second video signal with a linear arithmetic process reducing and magnifying an image in a vertical direction and in a horizontal direction.

9. An image conversion apparatus converting a first video signal outputted into a television signal said apparatus comprising:

a first correction circuit counteracting an inverse luminous property in the first video signal;

a linear arithmetic circuit executing a predetermined linear operation for a second video signal outputted from the first correction circuit; and a second correction circuit providing a third video signal outputted from the linear arithmetic circuit with another inverse luminous property counteracting, another luminous property of the television, wherein the first video signal consists of red, green and blue video signals, wherein said first correction circuit, said linear arithmetic circuit and said second correction circuit are provided for each of the red, green and blue video signals, and wherein said apparatus further comprises a conversion circuit outputting a luminance signal and a color-difference signal based on each of the red, green and blue video signals outputted from the second correction circuit.

10. An image conversion method converting a first video signal outputted into a television signal, comprising:

counteracting an inverse luminous property in the first video signal;

executing a predetermined linear operation for a second video signal having no inverse luminous property;

providing a third video signal for which the predetermined linear operation is executed with another inverse luminous property counteracting another luminous property of the television; and changing a scanning mode of the third video signal from a non-interlace mode to a interlace mode, wherein said predetermined linear operation is linear arithmetic process smoothing an image in a vertical direction.

11. An image conversion method converting a first video signal outputted into a television signal, comprising:

counteracting an inverse luminous property in the first video signal;

executing a predetermined linear operation for a second video signal having no inverse luminous property; and providing a third video signal for which the predetermined linear operation is executed with another inverse luminous property counteracting another luminous property of the television, wherein said predetermined linear operation is a linear arithmetic process reducing and magniying an image in a vertical direction and in a horizontal direction.

12. An image conversion method converting a first video signal outputted into a television signal, said method comprising:

counteracting an inverse luminous property in the first video signal;

executing a predetermined linear operation for a second video signal having no inverse luminous property; and providing a third video signal for which the predetermined linear operation is executed with another inverse luminous property counteracting another luminous property of the television, wherein the first video signal comprises red, green and blue video signals, wherein the inverse luminous property in each of the red, green and blue video signals is counteracted, the predetermined linear operation is executed for each of the red, green and blue video signals having in inverse luminous property, and each of the red, green and blue video signals for which the predetermined linear operation is executed is provided with another inverse luminous property counteracting a luminous property of the television receiver, and wherein said method further comprises a step of outputting a luminance signal and a color-difference signal based on each of the red, green and blue video signals with the another inverse luminous property.

* * * * *